United States Patent [19]
Stettner et al.

[11] Patent Number: 5,804,833
[45] Date of Patent: Sep. 8, 1998

[54] ADVANCED SEMICONDUCTOR EMITTER TECHNOLOGY PHOTOCATHODES

[75] Inventors: Roger Stettner; Howard W. Bailey, both of Santa Barbara, Calif.

[73] Assignee: Advanced Scientific Concepts, Inc., Santa Barbara, Calif.

[21] Appl. No.: 722,448

[22] Filed: Oct. 10, 1996

[51] Int. Cl.$^6$ .............................. H01L 29/06; H01L 29/12
[52] U.S. Cl. .............................. 257/10; 257/11; 257/442; 257/443; 257/466; 313/309; 313/336; 313/351; 313/500; 313/501
[58] Field of Search .............................. 257/10, 11, 442, 257/443, 466; 313/309, 336, 351, 500, 501

[56] References Cited

U.S. PATENT DOCUMENTS

| | | | |
|---|---|---|---|
| 3,755,704 | 8/1973 | Spindt et al. | 313/309 |
| 3,789,471 | 2/1974 | Spindt et al. | 29/25.17 |
| 3,812,559 | 5/1974 | Spindt et al. | 29/25.18 |
| 5,099,128 | 3/1992 | Stettner | 250/370.11 |
| 5,140,162 | 8/1992 | Stettner | 250/370.09 |
| 5,304,815 | 4/1994 | Suzuki et al. | 257/10 |
| 5,446,529 | 8/1995 | Stettner et al. | 356/4.01 |
| 5,475,225 | 12/1995 | Stettner | 250/370.11 |
| 5,591,986 | 1/1997 | Niigaki et al. | 257/10 |
| 5,646,479 | 7/1997 | Troxell | 313/495 |

OTHER PUBLICATIONS

Fabrication and Some Applications of Large–Area Silicon Field Emission Arrays, R.N. Thomas, R.A. Wickstrom, D.K. Schroder, H.C. Nathanson, Jul. 25, 1973, pp. 155–163.

Photosensitive Field Emission From Silicon Point Arrays, R.N. Thomas and H.C. Nathanson; Oct. 15, 1972, Appl. Phys. Lett., Vo. 21, No. 5, pp. 384–389.

The Semiconductor Field–Emission Photocathode; Dieter K. Schroder, R. Noel Thomas, James Vine, H.C., Nathanson, Dec. 1974, IEEE Transactions on Electron Devices, vol. Ed–21, No. 12, pp. 785–798.

*Primary Examiner*—William Mintel
*Attorney, Agent, or Firm*—Gottlieb, Rackman & Reisman, P.C.

[57] ABSTRACT

A detector to be used for detecting photons from the visible to far infrared spectrum is described. The detector uses unique photocathodes called Advanced Semiconductor Emitter Technology (ASET) as its critical element for converting the detected photons to electrons which are emitted into a vacuum. The electron is multiplied by accelerations and collisions creating a signal larger than the sensor noise and thus allowing the photon to be detected. ASET is/composed of distinct detector and emitter technologies.

33 Claims, 10 Drawing Sheets

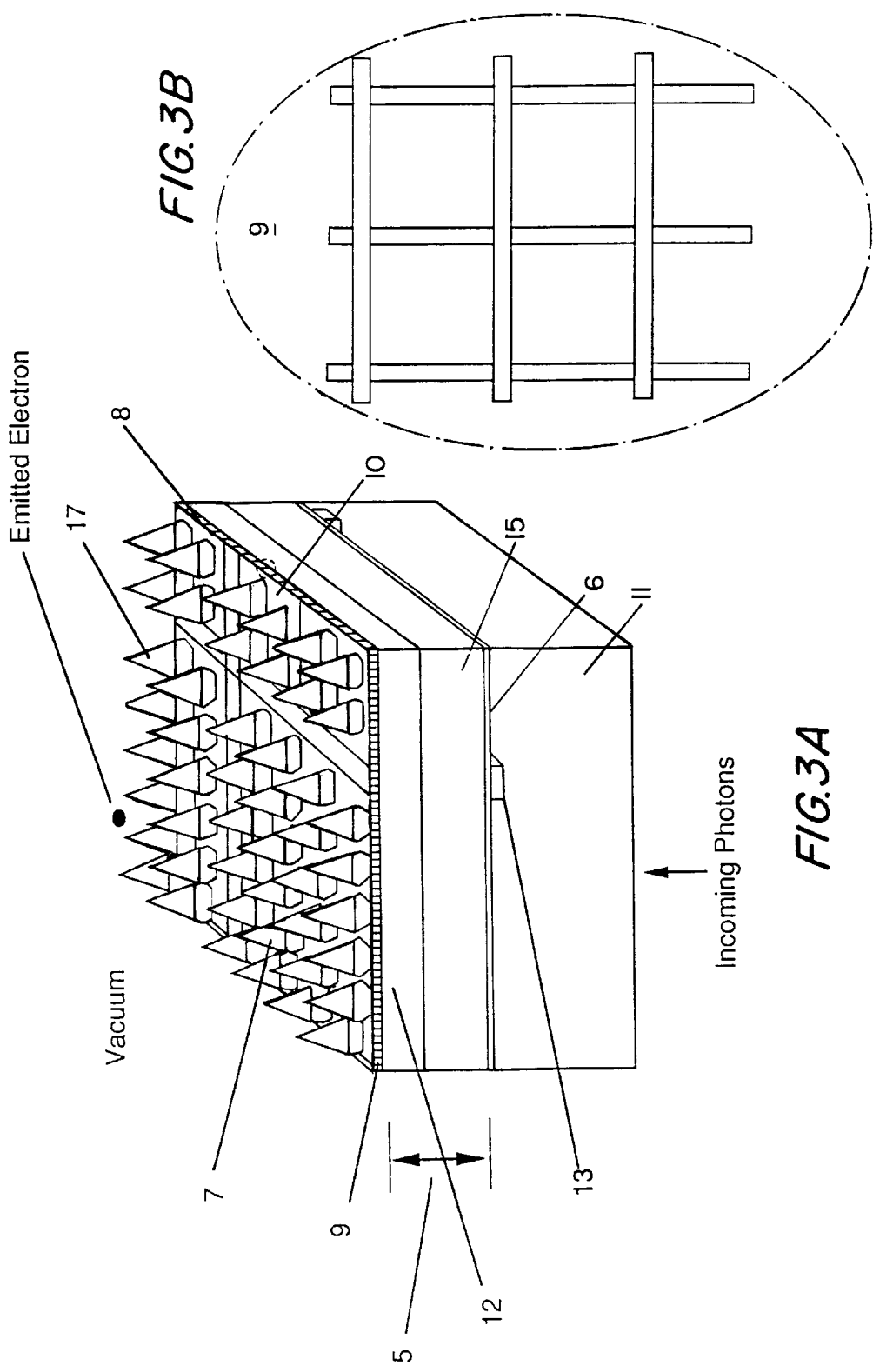

STEP 1

40 MIL (1000 μM) LIGHTLY DOPED (HIGH RESISTIVITY) STARTING WAFER

STEP 2

FORM NON-PATTERN TRANSPARENT WINDOW BY EITHER A BORON IMPLANT OR A EPITAXIAL GROWTH

STEP 3

GROW FIELD OXIDE AND PATTERN FOR FIELD EMITTER TIPS.

STEP 4

CHEMICALLY ETCH SILICON TO UNDERCUT OXIDE DISCS.

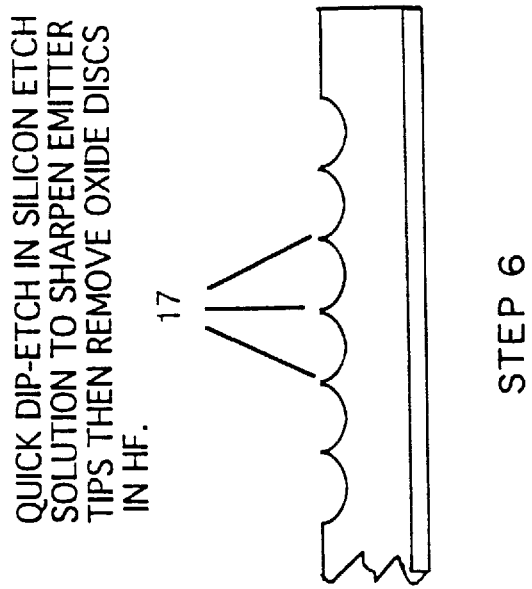
FIG.5B STEP 6
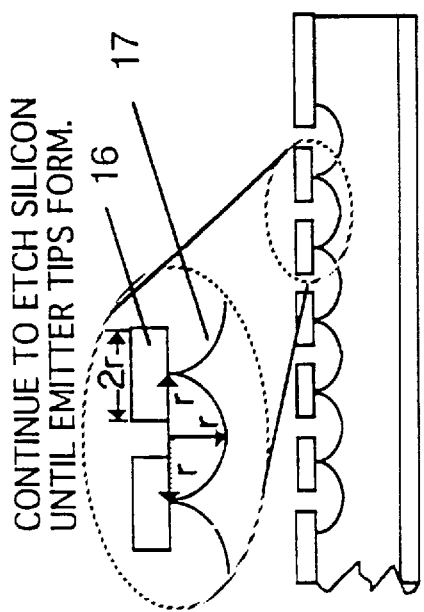
FIG.5A STEP 5

PATTERN AND ETCH KEYS INTO SILICON FOR MASK ALIGNMENT BEFORE AND AFTER EPITAXIAL GROWTH.

STEP 2

DETECTOR AND BLOCKING LAYERS #1 AND #2 ARE EPITAXIALLY GROWN.

STEP 4

20 MIL (500 μm) LIGHTLY DOPED STARTING WAFER.

STEP 1

NON-PATTERNED EPITAXIAL LAYER FOR TRANSPARENT CONTRACT; IMPLANTED BURIED GRID.

STEP 3

STEP 6  SILICON LAYER IS EPITAXIALLY GROWN FOR EMITTERS.

STEP 8  GROW FIELD OXIDE AND PATTERN FOR FIELD EMITTER TIPS.

STEP 5  IMPLANTED GRID ELECTRODE

STEP 7  PATTERN V-GROOVE SILICON ETCH AND IMPLANT TO BACKSIDE CONTACT AND GRID ELECTRODE.

CHEMICAL ETCH TO FORM
EMITTER STRUCTURE
STEP 9

REMOVE FIELD OXIDE. DRAWING IS
NOT TO SCALE.
STEP 10

SPUTTER PURE ALUMINUM ON
WAFERS. COAT WAFER WITH
PHOTORESIST AND THEN PATTERN
PHOTORESIST.
STEP 11

ETCH ALUMINUM PATTERN FOR
ELECTRIC FIELD SHIELDS
STEP 12

ADVANCED SEMICONDUCTOR EMITTER TECHNOLOGY PHOTOCATHODES

FIELD OF THE INVENTION

This invention relates to photocathode devices. In particular, it relates to photocathodes combining solid-state detector and emitter techniques. It also pertains to photocathodes having high quantum efficiency and useful for wavelengths on the order of 1–24 $\mu$m.

BACKGROUND OF THE INVENTION

Conventional photocathodes are used in a number of photon amplifier applications including photomultipliers (PMTs), micro-channel-plate (MCP) amplifier tubes and Digicons. The photocathode detects the photon and emits an electron. The electron (i.e., the photoelectron current) is amplified by one of the previously mentioned technologies and the resulting signal is larger than the sensor noise. However, conventional photocathodes have low quantum efficiency and respond to photons in a limited visible range; the visible spectrum is roughly 0.4 to 0.7 $\mu$m. Quantum efficiency in this context refers to the average number of electrons emitted per incident photon of a given wavelength.

PMTs, a particular electron amplifier using dynodes, are applied in a number of medical and laser detection applications. MCP amplifier tubes are used in similar applications, but because of their multiple-pixel imaging capability they are also used in night-vision goggles and imaging laser radar (LADAR). Night-vision MCP image tubes are vacuum structures containing a photocathode, a microchannel plate and a phosphor. Microchannel-plates amplify the photocathode electrons produced by dim-light photons, by collisions with the glass walls of the MCP, and these electrons, in turn, produce increased levels of visible light via collision with the phosphor.

In photon counting applications, a microchannel plate or photomultiplier tube increases the single-photon signal level above the sensor noise, thereby increasing sensitivity of the sensor to the level at which photon counting can be performed. In a digicon the electron emitted by a photocathode is guided by a magnetic field and accelerated by an electric field, to energies of thousands of electron volts. The photoelectron impacts a silicon diode array and amplification results by impact ionization because it requires only about 3.3 Ev to produce an electron-hole pair.

Conventional photocathodes such as S-20 have a useful spectral range of about 0.45 $\mu$m to 0.55 $\mu$m, where the quantum efficiency is about 10%; the quantum efficiency drops dramatically as the wavelength increases: at 0.9 $\mu$m it is only about 1%. "Special Purpose Photosensitive Devices", ITT Publication, ITT Electro-Optical Products Division, Tube and Sensor Laboratories, Fort Wayne, Ind. Currently to detect Nd:YAG laser light the wavelength is halved (frequency doubling) using a nonlinear crystal with roughly a factor of 4 loss of photons. Use of low quantum efficiency conventional photocathodes further reduces the detection efficiency.

Currently there are no photocathodes in the short wavelength, mid wavelength or long wavelength infrared (about 1–24 $\mu$m). Unlike frequency-doubled detection systems used with the Nd:YAG laser, there are currently no photocathodes that can be used with the $CO_2$ laser.

Conventional photocathodes are also difficult to make and require a very high vacuum due to their sensitivity to contamination.

Solid-state detector and emitter technologies are known. The particular emitter technology used in embodiments of this invention is based upon the silicon emitter technology described in the following references: D. K. Schroder et al, "The Semiconductor Field Emission Cathode", IEEE Trans., Vol. ED-21, No. 12 Dec. 1974; R. N. Thomas and H. C. Nathanson, "Transmissive Mode Silicon Field Emission Array Photoemitter", Appl. Phys. Lett., Vol. 21, No. 8, 15 Oct. 1972; R. N. Thomas, R. A. Wickstrom, D. K. Schroder and H. C. Nathanson, Fabrication and Some Applications of Large-Area Silicon Field Emission Arrays, Solid-State Electronics, 1974, Vol. 17, pp. 155–163; References 2–4. An alternative metal-emitter technology exists, C. A. Spindt, K. R. Shoulders and L. N. Heynick, U.S. Pat. Nos. 3,755,704 (1973), 3,789,471 (1973), 3,755,704 (1973), 3,789,471 (1973), 3,812,559 (1974). This metal-emitter technology is unsuitable to combine with detector technologies. In addition the metal emitter technology has a much larger work function or electron affinity than the semiconductor technology and therefore requires a higher operating voltage. The vacuum-surface interface of the semiconductor acts to reduce the electron affinity below that of the solid semiconductor material.

BRIEF DESCRIPTION OF THE PRESENT INVENTION

The Advanced Semiconductor Emitter Technology (ASET) photocathode devices described in this patent combine solid-state detector and emitter technologies into one device with very significant advantages over existing photocathode technology. ASET utilizes detectors operating over a very broad spectral range, from the visible to the far infrared, with high quantum efficiency. These detectors can not be used as photocathodes themselves but in combination with solid-state emitter technology they become very efficient very broad-spectrum photocathodes. One of the virtues of photocathodes is that they can be used in an electron amplification configuration to detect individual photons. The ASET emitter technologies are combined with another solid state chip in an evacuated enclosure to form a compact, electron-amplifying detector so sensitive it can detect individual photons in the visible to the far infrared. One such embodiment of the present invention is called the proximity-focused photon detector.

It is an object of the present invention to provide Advanced Semiconductor Emitter Technology (ASET) Photocathode devices. One of the ASET photocathode devices, the ASET-V, has a quantum efficiency of 60% to 70% at 0.5 $\mu$m and 80% to 100% at 0.9 $\mu$m, about a factor of 7 to 100 larger than conventional photocathodes.

It is a further object of the present invention to provide an ASET-V photocathode having a spectral range extending out to 1.1 $\mu$m, making it applicable to detecting signals from near-infrared Neodymium YAG (Nd:YAG, 1.06 $\mu$m) lasers.

It is a further object of the present invention to identify or see light about one to two orders of magnitude less intense as compared to conventional photocathodes. High quantum efficiency at the Nd:YAG wavelength means that for higher laser power applications, instead of increasing laser power, a sensitive detector such as ASET-V could be used. In photon counting applications, ASET-V is equivalent to an increase in Nd:YAG laser power by roughly a factor of 30. (Because of laser material heating, increasing laser power while maintaining a useful repetition rate is a technical problem.)

It is a still further object of the present invention to provide ASET-IR technology, having a quantum efficiency of greater than 50% and a spectral range is from 2 $\mu$m to 24 $\mu$m. This spectral range includes the $CO_2$-laser wavelength, 10.6 $\mu$m and other lasers that can be used for remote spectroscopy of atmospheric pollutants.

It is a further object of the present invention to provide an ASET-IR more sensitive than any known infrared detector (IR) detector—with a suitable electron amplifier it can detect individual IR photons—having clear applications for passive detection of faint long wavelength infra red emitting objects and potentially very large cost savings, particularly for satellite systems.

It is a still further object of the present invention to provide uses of the ASET-IR in $CO_2$ laser radar (ladar) and ladar-like applications.

A still further object of the present invention is the use of the ASET-IR, as a $CO_2$ laser photocathode, to achieve the effective equivalent of an increase in $CO_2$ laser power by about a factor of 1000, with respect to maximum range using current direct-detection detector technology. In spite of the inefficiency of the Nd:YAG frequency doubled photocathode system it is still useful for extending the range of Nd:YAG ladars.

Yet a still further object of the present invention is to provide such devices that can be made by most foundries, are stable chemically and it can handle a few orders of magnitude higher pressure than conventional photocathodes. This will make ASET vacuum tube manufacturing much simpler and less expensive than conventional-photocathode vacuum tubes.

Yet another object of the present invention is to replace existing photocathodes with a much higher quantum efficiency technology and to extend photocathode applications from the near IR to the LWIR. Even if the only application was detection of Nd:YAG or $CO_2$ laser photons, the impact of this extension should be enormous.

BRIEF DESCRIPTION OF THE DRAWINGS

FIG. 3 is a perspective view of a preferred embodiment of the near to far infrared ASET photocathode device. The blowout shows the structure of the grid electrode.

FIG. 5 shows the last two processing steps for the ASET-V.

DETAILED DESCRIPTION OF A PREFERRED EMBODIMENT OF THE PRESENT INVENTION

Figure 1:
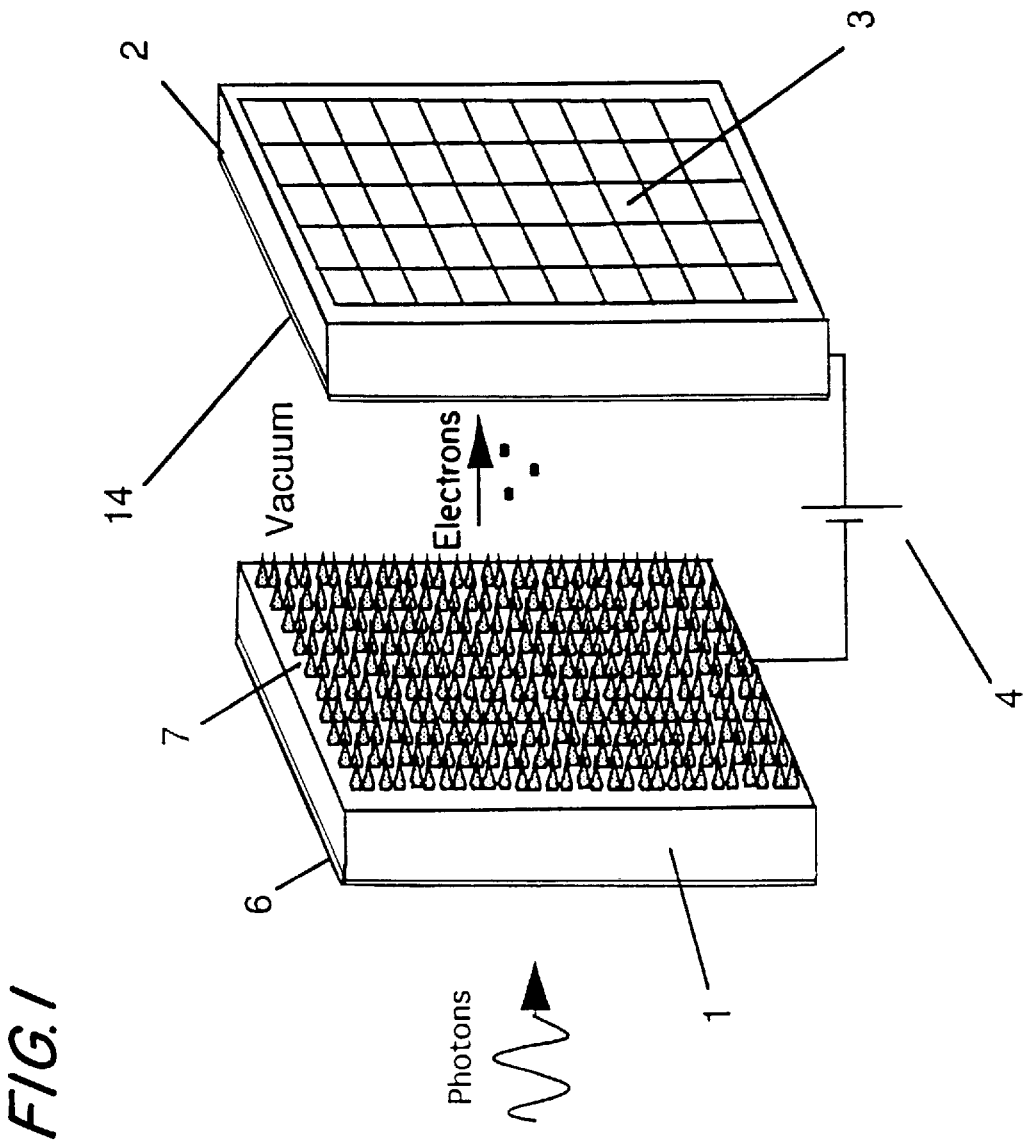
FIG. 1 is a perspective view of a preferred embodiment of the present invention, the proximity-focused photon detector employing the ASET photocathode device.

A preferred embodiment of the present invention, the proximity-focused photon detector using Advanced Semiconductor Emission Technology (ASET) as a photocathode device, is described. The proximity-focused detector is depicted in FIG. 1 and is capable of detecting the smallest particle of light, the photon, with high efficiency. The proximity focused detector in FIG. 1 is comprised of an ASET photocathode device 1, a diode array 2 with a corresponding readout unit cell electronics array 3, fabricated on the front side of the diode array, and a voltage source 4 which accelerates electrons emitted from the photocathode device 1, through a vacuum, into the diode array 2. The back contact 14 of the diode array 2 is the anode for the photocathode device 1. Typical dimensions of the arrays are a few square millimeters (mm) to a few hundred square centimeters. A typical distance between the arrays is 1 mm and a typical source voltage 4 is 10 kilovolts.

Figure 2:
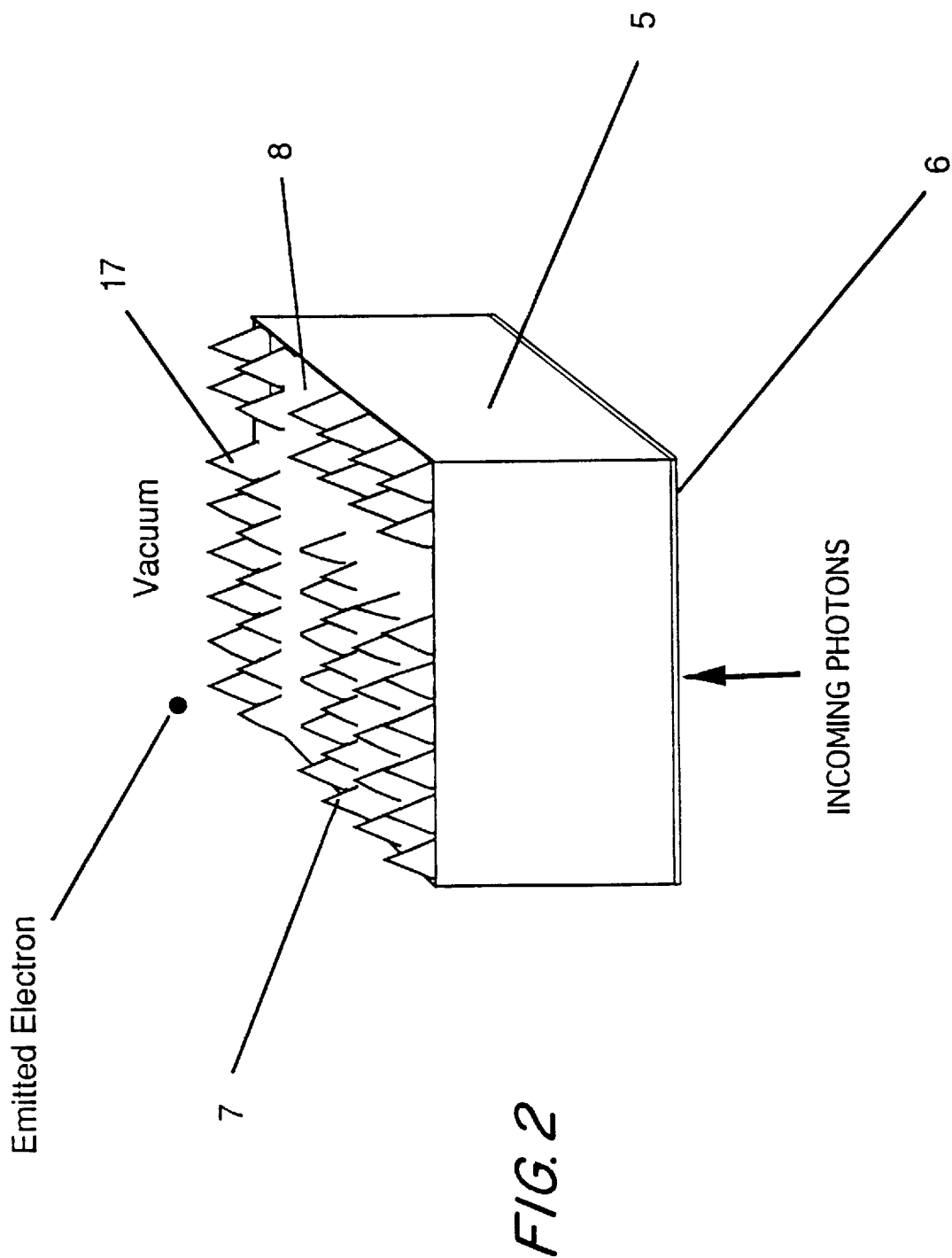
FIG. 2 is a perspective view of a preferred embodiment of the visible to near infrared ASET photocathode device.
Figure 4A:
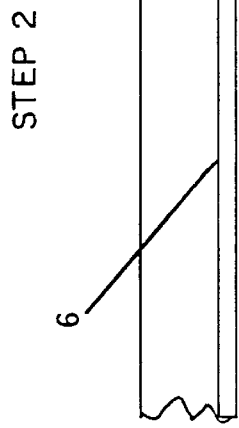
FIG. 4 shows the first four processing steps for the ASET-V.
Figure 4B:
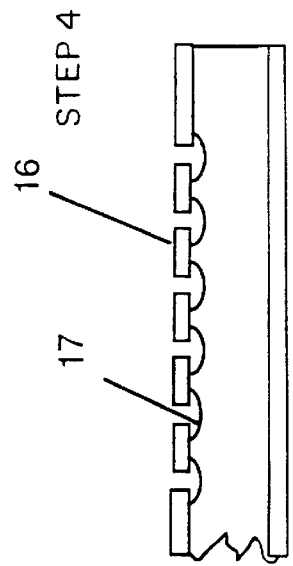
Figure 4C:
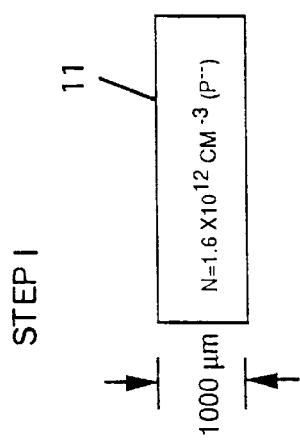
Figure 4D:
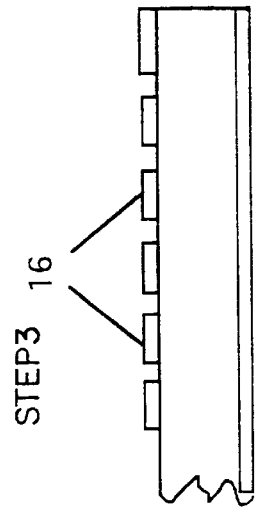
Figure 6B:
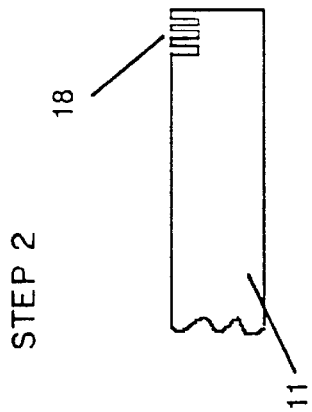
FIG. 6 shows the first four processing steps for the ASET-IR.
Figure 6D:
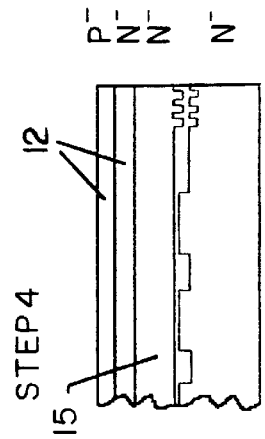
Figure 6A:
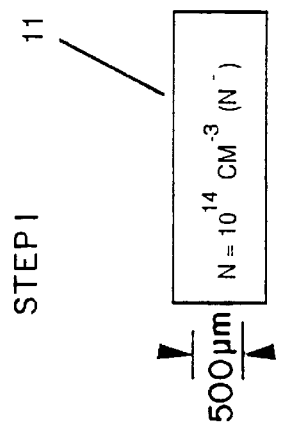
Figure 6C:
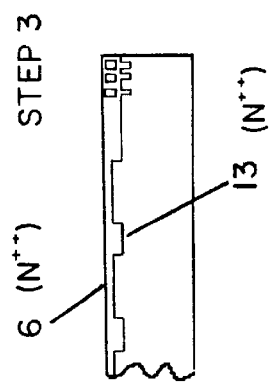
Figure 7B:
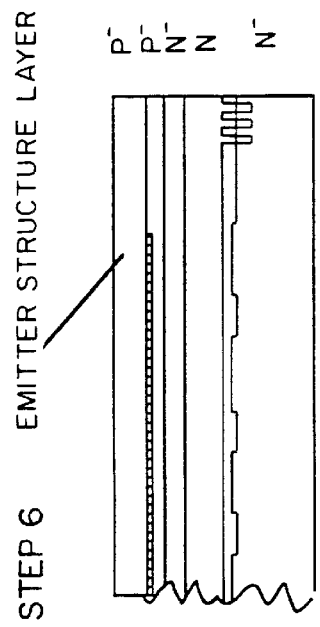
FIG. 7 shows the second four processing steps for the ASET-IR.
Figure 7D:
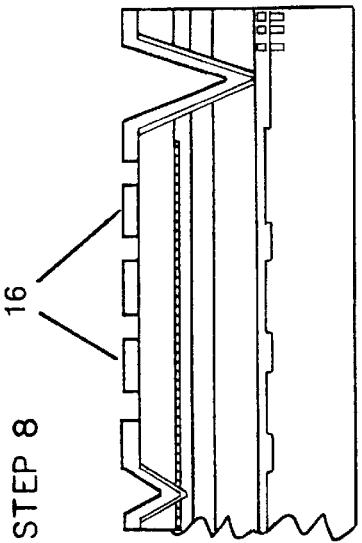
Figure 7A:
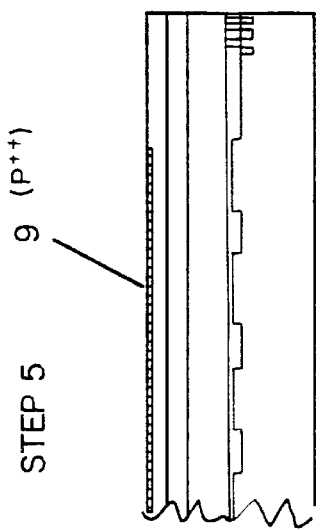
Figure 7C:
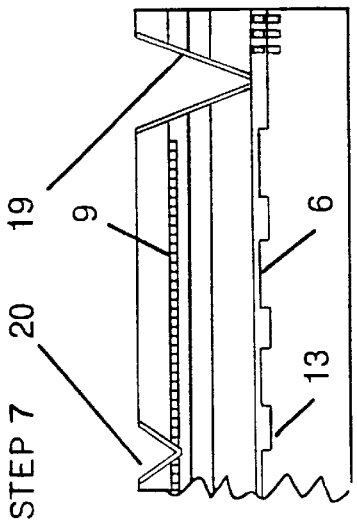
Figure 8A:
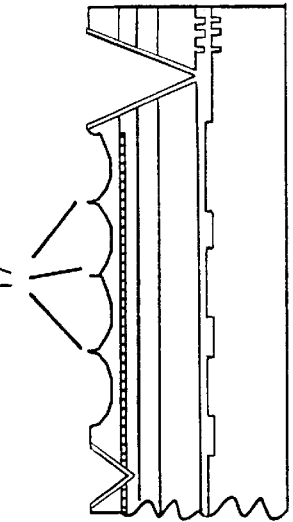
FIG. 8 shows the last four processing steps for the ASET-IR.
Figure 8B:
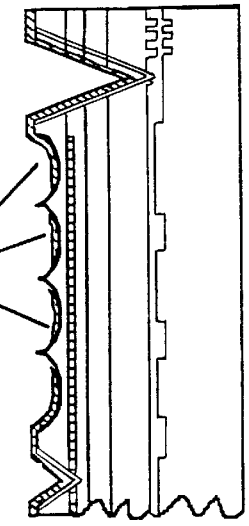
Figure 8C:
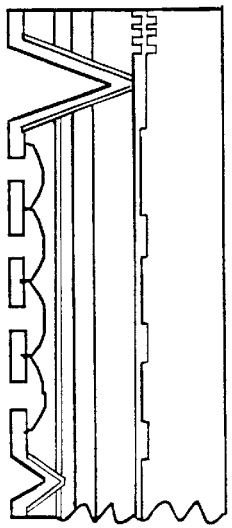
Figure 8D:
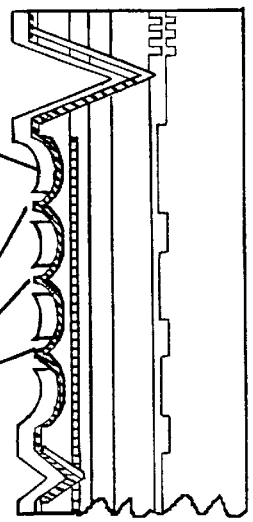

Two preferred embodiments of the ASET photocathode device are also described. A small section of the first embodiment is depicted in FIG. 2 and a small section of the second embodiment is depicted in FIG. 3. Both embodiments, absorb light and emit electrons. The ASET photocathode device is capable of detecting a photon of light, with high efficiency, when used with a suitable electron amplification means. The proximity focused detector configuration in FIG. 1 provides one particular electron amplification means. The first ASET photocathode device embodiment is most appropriate for shorter wavelengths of light, ultraviolet, through the visible, to near infrared; it is termed ASET-V. The second ASET photocathode device embodiment is most appropriate for longer wavelengths of light, Long Wavelength Infrared (LWIR); it is termed ASET-IR.

The preferred embodiment of the ASET-V photocathode device, a small section of which is depicted in FIG. 2, comprises a detector structure 5, a backside electrical contact or cathode 6, and an emitter structure 7. The emitter structure is composed of an array of tiny cone-shaped emitters 17. This cone-shaped emitter array is either continuous or interrupted by pixel spaces 8 which define pixels. The detector and emitter structures are one continuous piece of semiconductor material. A typical piece of material would be a crystalline silicon wafer 100 mm in diameter and 1 mm thick. Typical pixel dimensions are 30 $\mu$m to 150 $\mu$m. One ASET-V might take up the whole wafer or just a small portion of it. Typically, the contact 6 is either ion-implanted in the wafer or a highly doped contact layer is grown on the back surface of the wafer. The concentration of the contact doping times its depth is small enough that a negligible number of photons are absorbed in the contact. Typical dimensions of the cone-shaped emitters are 3 to 20 microns ($\mu$m) in height and 3 to 20 microns in base diameter. The substance may be applied at the tip of the cone to reduce the electron affinity of the solid state material. Cesuim is an example of this substance.

The preferred embodiment of the ASET-IR, a section of which is depicted in FIG. 3, comprises a detector structure 5 a backside electrical contact 6 and an emitter structure 7. The emitter structure is composed of an array of tiny cone-shaped emitters 17. The cone-shaped emitter array can be continuous or interrupted by pixel spacing 8. The ASET-IR is further composed of an electrical contact or shield 10, which covers the lower part of the emitters, a grid electrode 9, and a substrate 11 upon which the ASET-IR is fabricated. The detector structure 5 is composed of a number of layers: the detector layer 15, and one or two blocking layers 12. The backside electrical contact 6 is associated with an optional window grid 13 which defines pixels and enhances the electrical conductivity of the backside electrical contact.

Typically the backside electrical contact 6 and the window grid 13 are implanted in a semiconductor crystalline substrate 11 which is transparent to infrared photons. As will be described in detail later, most of the other layers are epitaxially grown on the annealed contact 6. Typically the thickness of the layers range from 0.05 $\mu$m to 50 $\mu$m. The thickness of the crystalline substrate is typically 20 to 40 mils. The cone-shaped emitters and the array size have the same dimensions as the ASET- V emitter structure. The substance may be applied at the tip of the cone to reduce the electron affinity of the solid state material. Cesuim is an example of this substance.

In operation photons enter the ASET-V or ASET-IR photocathode device 1 in FIG. 1, create an electron hole pair in the detector portion of the device and the electron is emitted from one of the cone-shaped emitters of the emitter structure 7 (FIGS. 2 or 3). The electron is then accelerated by the voltage source 4 until it achieves an energy that will allow penetration into the diode array 2 as well as the creation of many additional electron-hole pairs in the individual diodes by impact ionization. The diode separates the electron-hole pairs and the electrons are collected in the readout array 3. One unit cell in the readout array 3 is associated with each diode in the diode array 2. The energy required to create an electron-hole pair in the diode is about three times the band gap of the semiconductor material and so electron amplification larger than 1000 are easily possible. This large amplification produces a photon signal larger than the readout noise so that even a single-photon signal is large enough to be detected.

With ASET-V photocathode device operation the voltage 4 in FIG. 1 is large enough to deplete most of the semiconductor between the emitter structure 7 and the backside contact 6, in FIG. 2, creating a depletion electric field in this region. A photon penetrating the backside contact 6 or cathode, in FIG. 2, is absorbed in the bulk of the semiconductor, which is the detector structure 5. Photon absorption generates an electron-hole pair in a silicon detector structure. The depletion electric field sweeps the electron into the emitter portion of the structure and the hole to the cathode 6. In this way an ASET-V photocathode device functions very much like a back-biased diode detector.

Near the emitter structure the internal and external fields are increased by the shape of the cone-shaped emitters. The fields increase to a level at which field emission occurs into the vacuum, at the cone-shaped emitter tips, with high probability. Once the electron is outside the semiconductor material it can be accelerated in a number of ways leading to electron multiplication or amplification. The concentration of the back contact 6 doping times its depth must be small in comparison to the reciprocal of the absorption cross section of the photons of interest, to prevent absorption of a substantial fraction of the photons in the contact.

The ASET-V detector structure 5, in FIG. 2 is typically a high resistivity p-type semiconductor substrate in which a cathode 6 has been implanted on one side of the substrate and cone-shaped emitters 7 have been etched directly into the other side of the semiconductor substrate. A thick detector structure 5 will result in a high quantum efficiency for wavelengths near the bandgap cutoff. In particular if the substrate is silicon, the Nd:YAG laser wavelength of 1.06 $\mu$m will be absorbed with high quantum efficiency; the detector structure thickness could be as large as a typical silicon wafer, 20–40 mils. Very low resistivity substrates are required so that the cathode-anode voltage difference, 4 in FIG. 1 for example, will deplete throughout the detector volume while also generating a high enough field at the tips of the emitters 7 to cause field emission of the electrons. The anode is external to the photocathode device; in particular it is the back contact 14 of the diode array in FIG. 1. The field at the emitter tips is related to the depletion depth and doping concentration of the detector structure (or equivalently the voltage between the anode and cathode) and on the shape of the emitter structure.

Operation of the ASET-IR is similar to the ASET-V in that a photon creates an electron-hole pair in the detector structure 5 (FIG. 3), the electron is swept into the emitter structure 7, and the hole is swept into the backside contract 6 by internal electric fields. The fields are high enough at the cone-shaped emitter tips to emit the electron into the vacuum with high probability. However, details of the photon absorption and electron emission processes in the ASET-V and ASET-IR are different because of the differences in the device structure and temperature of operation. One type of ASET-IR detector structure is like that of an Impurity Band Conduction (IBC) detector, except that the photon-generated electron is not collected by a contact but passes from the detector to the emitter structure by means of grid electrode 9; a solid electrode would collect the electron and prevent the electron transport to emitter structure.

The ASET-IR requires two bias voltage sources while the ASET-V depicted in FIG. 2 requires only one. In the ASET-IR a separate bias, applied between the grid electrode 9 and the backside contact 6 is required to activate the detector structure. Another bias, applied between the grid electrode 9 (FIG. 3) and the back contact 14 of the diode array in FIG. 1, activates the emitter structure. The single ASET-V bias (4, FIG. 1) activates both structures. An alternate design of the ASET-V would use two biases and a grid electrode just as in the ASET-IR.

If the ASET-IR detector structure is a silicon IBC detector then the temperature of operation is about 7°–10° K. At this temperature all intrinsic carriers are frozen out and only a small field is required to deplete through the material between the grid electrode and the vacuum, leading to an undesirable punch-through condition: a large current directly from the grid electrode into the vacuum which is not associated with photon detection. Punch-through is avoided by means of a conducting shield 10 which reduces the field between the grid electrode 9 and the shield 10; the shield can be at the same voltage as the grid electrode. The shield only covers the lower part of the cone-shaped emitters; complete coverage is unnecessary to prevent punch-through and would prevent the photon-generated electrons from being emitted into the vacuum from the emitter tips.

Operation of IBC detectors is well known R. Baron, J. P. Baukus, A. F. Rabideau and M. H. Young, "IBC Detector Performance in Low Photon Backgrounds with Comparisons to Conventional Photoconductive Detectors", July 1986; M. D. Petroff and M. G. Stapelbroek, "Responsivity and Noise Models of IBC Detectors", August 1984, Proc. IRIS Detector, 1984, No. 2. However, the usual blocking layer 12 may be modified for operation within an ASET-IR. If the detector layer 15 is n-type material and the emitter-structure is p-type then the blocking layer 12 may be composed of two layers of material to make a transition between the detector and emitter structure material. The blocking layer material nearest the detector would be n-type and the blocking layer material nearest the emitter structure would be p-type. Alternatively the blocking layer material may be all one type.

Fabrication of the preferred embodiment of the ASET-V photocathode device is depicted in FIGS. 4 and 5. The preferred starting material for the ASET-V photocathode device, as depicted in FIG. 4 step 1, will be double sided polished 40 mil (1000 micron) thick lightly doped Boron ($1.6 \times 10^{12}$ cm$^{-3}$: 10,000 ohm/cm) p-type wafer 11 with a crystal orientation of (111). A lightly doped wafer is important in order to maximize the photon absorption when photons travel through the backside contact 6, FIG. 2, into the bulk of the wafer. The lightly doped (highly resistive) wafer will make possible a fully depleted detector region thereby allowing the photon-generated electron and hole to be swept out of the detector region. The specific crystal orientation produces the best emitter performance results. The starting wafers are polished on both the front and back sides in order to reduce photon scattering on a potentially rough (unpolished) surface. The polished backside will improve the efficiency of photon transmission.

The second process step forms the backside contact 6. This window needs to be doped heavily enough to ensure a good electrical contact and yet doped light enough to prevent unwanted absorption of incoming photons. The window may be constructed by either implantation or epitaxial growth. The decision to grow depends on the epitaxial reactor grow rates, temperature and tight process control parameters. The implant must be activated by annealing after implantation and the degree of annealing is critical. Excessive annealing will cause the implant to spread too much while annealing too little will cause non-activation of implanted atoms. The distance of the ion implant into the silicon surface is dependent on the annealing temperature, implant energy, and back-side oxide thickness. It would be an optimum condition if the transparent window were only 200 angstroms thick and doped to $1 \times 10^{19}$ cm$^{-3}$ after all processing steps.

The third process step in FIG. 4 generates a $S_1O_2$ silicon mask for the field emitters tips as illustrated in step 3. Field oxide ($S_1O_2$) disks or squares 16 one micron thick are grown on the front side of the wafer. The thickness should be adequate to account for any etching that may occur on the oxide itself. This mask will be used to control where etching in the silicon will take place.

The forth processing step shows the beginning of the silicon wafer etching to form the cone-shaped emitters 17. An isotropic or non-preferential etch is used to prevent any directional etching along the crystal orientation. An isotropic etch will etch in all directions at the same time in equal amounts when the etching solution is made to circulate. Utilizing this method of etching produces hemispherical holes in the silicon with a radius 'r'. This method of etching is also based on the fact that silicon etches considerably faster than oxide ($S_1O_2$) in mixtures of nitric, acetic and hydrofluoric acids in compositions of 25:10:3. The progressive etching and undercutting of the one micron thick oxide disks 16 is illustrated in step 4. Etching is typically carried out at room temperature with etch times in the neighborhood of 15 to 30 minutes depending on the exact dimensions of the oxide pattern. The blowup in process step 5, FIG. 5, illustrates the relationship between the etch depth and the dimensions of the oxide discs 16. When isotropic etching of silicon takes place, circular point structures of height approximately equal to one half the diameter of the oxide islands (discs) are formed.

The fifth process step is a continuation of step 4. If the detector wafers are left in the etching solution too long, the emitter tips will become blunted. The blunted tip radii are usually greater than 200 angstroms which results in an inefficient emitter tip. The geometric uniformity depends mainly on achieving extremely uniform etch rates over the entire array.

The sixth process step is the last step in the fabrication of the ASET-V photocathode device. In this process step the emitters 17 are given a further quick dip-etch and then the oxide is removed with buffered HF. After rinsing and drying, the ASET-V photocathode devices are now ready for dicing and packaging. The preferred starting material for the ASET-IR photocathode device as depicted in FIG. 6 step 1 should be double sided polished 20 mil (500 micron) thick lightly doped phosphorous ($^2$ $10^{14}$ cm$^{-3}$) wafer 11 with a crystal orientation of 100. A lightly doped wafer is important in order to minimize the infrared (IR) absorption when IR photons travel through the substrate (starting wafer) 11, FIG. 3, to the detector layer. The crystal orientation is required to create the proper electrical connections to the electrical contacts: to the grid electrode 9 and to the backside contact 6. These connections are called v-grooves (19 and 20 FIG. 3, step 7); another crystal orientation would not generate the required v-grooves. The starting wafers must have a polished backside (unprocessed side) in order to prevent infrared light scattering on a potentially rough (unpolished) surface. The polished backside will improve the effective efficiency of infrared (IR) transmission.

The first mask to be processed on the starting wafers must be the key alignment mask as illustrated in step 2, FIG. 6. This mask has both the scribe lanes to define each die area and the alignment keys 18 to align masks succeeding the first mask. The alignment keys must be etched into the silicon substrate, using KOH for example, to ensure proper alignment after epitaxial growth of the detector layer 15. The detector layer is heavily doped and will therefore absorb projection alignment light. An etched key structure will be visible on the surface of the detector layer in order for the field grid and v-groove mask to align properly.

The second mask is a non-critical mask that defines each pixel window. This window grid 13 is shown in step 3 and makes contact to a backside v-groove 19, FIG. 7, step 7. The second mask is used in the process of generating a mask for the arsenic back-side grid implant by way of an $S_1O_2$ mask. This implant needs to be doped heavily enough to ensure a good electrical contact and should be degenerative at cryogenic temperatures. The next step is to strip the $S_1O_2$ mask from each wafer and then field implant the backside contact 6. An alternative approach is to epitaxially grow the backside contact on each wafer. This decision depends on the epitaxial reactor growth rates, temperature and tight process control parameters. The implant must be activated by annealing after implantation. Annealing too much will cause the implant to spread too much while annealing too little will cause non-activation of implanted atoms. Non-activation will generate defects in the silicon epitaxial layer above it. These defects generate unwanted dark current in the pixel where the defect occurs and may make pixels inoperative. Usually a light silicon etch is given to all wafers right before the growth of the first epitaxial layer and it is this etch that might remove the transparent window if it is too deep. The distance of the ion implant to the silicon surface is important. It would be an optimum condition if the transparent window were only 200 angstroms thick and doped to $5 \times 10^{18}$ cm$^{-3}$ after all processing steps. Like the ASET-V, the concentration of the contact doping times its depth must be small in comparison to the reciprocal of the absorption cross section of the photons of interest, to prevent absorption of a substantial fraction of the photons in the contact.

The next process step grows the detector layer 15 and the blocking layers 12 as depicted in step 4. Epitaxial growth should occur at the lowest temperature possible at an acceptable growth rate, usually around 1000 degrees centigrade.

The higher the epitaxial growth temperature the more the transparent window will spread and cause detector operability problems. The transition from the detector layer to the blocking layer or layers should be as sharp as possible to minimize thickness and operational problems. The blocking layer 12 should either be n-type silicon doped to $5 \times 10^{14}$ cm$^{-3}$ or two layers one n-type and one p-type both doped to $5 \times 10^{14}$ cm$^{-3}$.

The third masking step is used to generate a $S_1O_2$ ion implantation mask for the grid electrode and is illustrated in step 5, FIG. 7. This mask should be made using minimum design rules to minimize the grid cross section and therefore maximize the open area and the electrons passing from the detector region to the emitter region. Each grid rod (FIG. 3 blowup) should be on 10 micron centers with each rod having minimal width. Grid-electrode rods may be extended both in the x and y direction may intersect. The grid-electrode mask will align to the top surface key impressions made by the first key mask set. As illustrated in step 7 the grid electrode 9 should not extended into the backside v-groove 19. The grid electrode 9 will make physical contact to grid-electrode v-groove 20 contacts. The doping concentration of the grid electrode should be kept to a minimum because of the annealing problems that might arise. Implant damage that has not been annealed out could cause defects in the emitter structure epitaxial layer that is grown in step 6. This would lead to excessive dark current, anomalous effects and inoperable detector pixels.

The forth masking step is used to create a $S_1O_2$ silicon etch mask for the v-grooves 19, 20, as depicted in step 7. There are two different types of v-grooves, the backside contact grooves 19 and the grid electrode grooves 20. An anisotropic or preferential etch such as pyrocatechol ($C_6H_4$(OH)$_2$, (P)) ethylene diamine (NH$_2$(CH$_2$)$_2$ NH$_2$, (ED)) and water is used to etch the v-grooves to the desired contact depth or isolation point. The width of the v-groove mask opening defines the depth of the silicon etch. Each v-groove is etched down to a predetermined level by the self stopping action of the etching solution and crystalline structure. Next, all of the field oxide is stripped off the wafers in preparation for the next mask.

Steps 8 in FIG. 7 and steps 9 and 10 in FIG. 8 are essentially the same as steps 3 to 6 in FIGS. 4 and 5, for the ASET-V. Steps 11 and 12 illustrate the fabrication of the electric-field shield 10. Aluminum 19 is deposited over the whole emitter structure surface. Patterned photoresist 20 exposes only the aluminum near the cone-shaped emitter tips 17 that will be etched away.

Figure 9:
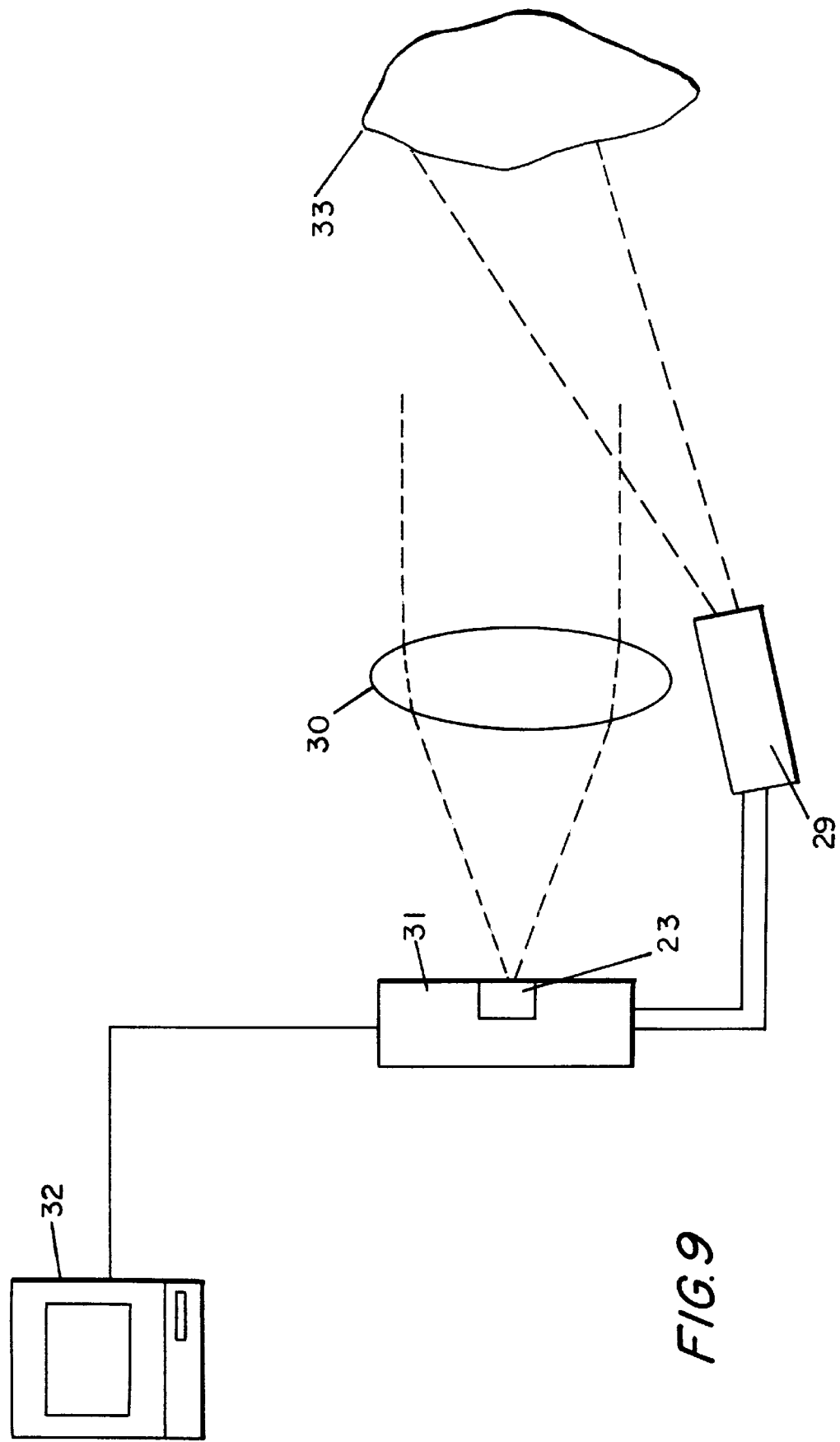
FIG. 9 is a cross section view of a vacuum tube detector employing the ASET photocathode.

FIG. 9 depicts a vacuum tube amplifier 23 using the ASET photocathode for photon detection. Photons enter the input window 25 which can be clear glass or a fiber optic plate. Photons then enter the ASET photocathode 24 and electrons are emitted from its backside. The vacuum tube may contain an electron multiplier 28 which will increase the number of electrons. Electrons are accelerated to the electron multiplier 28 by an applied voltage. Under these circumstances the electrons will be collected by an array of anodes 26 or they may impact a phosphor generating light; light is output from the back of the tube. Electrons are accelerated to the anode array 26 or phosphor by an applied voltage. If the electrons are collected by anodes, the signals will be output via wires 27 which feed through the tube wall. If the anode 26 is replaced by a PIN diode array, then amplification can result in the diode by impact ionization, without the necessity of the electron multiplier. In this case, the electrons are accelerated directly into the PIN diodes by an applied voltage.

Figure 10:
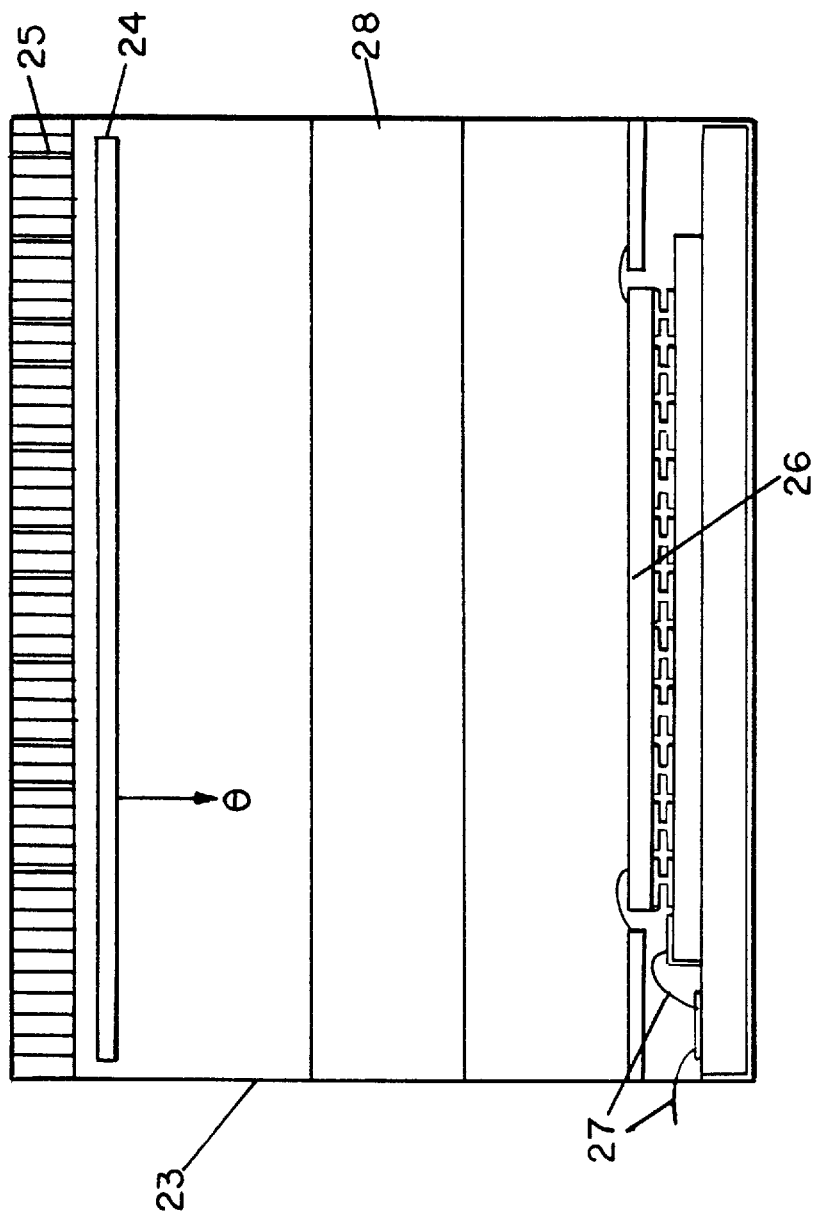
FIG. 10 is a diagram of an imaging or pollutant analysis system employing ASET vacuum tube detector.

FIG. 10 depicts a light analysis system using a light source 29 to illuminate an object 33. The object 33 could be a pollutant cloud. The light source 29 could be a variable frequency laser. Light is reflected or re-radiated from the object 33 and enters a lens 30. The lens focuses the light on the ASET-based vacuum tube amplifier 23. Data from the vacuum tube amplifier 23 is analyzed in, and displayed by, the processing computer 32.

What is claimed is:

1. A photon detector comprising
   a photocathode device for absorbing a photon of light and emitting an electron,
   amplification means to multiply the number of electrons, and
   readout means to convert the electrons into an electrical signal,
   said photocathode device comprising
      detector structure means for absorbing the photons and creating an electron-hole pair,
      voltage means for creating electric fields within and outside the device to separate the electron from the hole and aid in electron emission,
      electrical contacts and shields to create and shape the electric fields from the voltage means,
      emitter structure means comprising
         cone-shaped emitters to transfer the electron from the inside of the device to the outside of the photocathode device.

2. The high sensitivity photon detector of claim 1, wherein the amplification means is a microchannel plate.

3. The high sensitivity photon detector of claims 1, wherein the amplification means is a digicon.

4. The high sensitivity photon detector of claim 1, wherein the amplification means is a photomultiplier tube.

5. The photon detector of claim 1, wherein the amplification means is electric field acceleration of the electron and subsequent collision with a solid-state device.

6. The high sensitivity photon detector of claim 1, wherein the amplification means is electric field acceleration of the emitted electron and subsequent collision with a solid-state pixel array.

7. The high sensitivity photon detector of claim 1, wherein the amplification means is electric field acceleration of the electron and subsequent collision with a phosphor or scintillator.

8. A photocathode device for absorbing a photon of light and emitting an electron, comprising
   detector structure means for absorbing the light and creating an electron-hole pair,
   voltage means for creating electric fields within and outside the device to separate the electron from the hole and aid in electron emission,
   electrical contacts and shields to create and shape the electric fields from the voltage means,
   emitter structure means comprising cone-shaped emitters to transfer the electron from the inside of the device to the outside of the device.

9. The device for absorbing a photon of light and emitting an electron of claim 8, wherein the detector structure means is a solid-state detector.

10. The device for absorbing a photon of light and emitting an electron of claim 8, wherein the detector structure means is silicon.

11. The device for absorbing a photon of light and emitting an electron of claim 8, wherein the solid-state detector structure means is silicon.

12. The device for absorbing a photon of light and emitting an electron of claim 8, wherein the detector structure means is silicon which is depleted by the voltage means and electrical contact means to greater than 1 μm but less than 0.1 cm.

13. The device for absorbing a photon of light and emitting an electron of claim 8, wherein
the detector structure means is silicon which is depleted by the voltage means and electrical contact means to a depth such as to make it an absorber of Nd:YAG photons.

14. The device for absorbing a photon of light and emitting an electron of claim 8, wherein the detector structure means is Mercury Cadmium Telluride.

15. The device for absorbing a photon of light and emitting an electron of claim 8, wherein the detector structure means is an Impurity Band Conduction detector.

16. The device for absorbing a photon of light and emitting an electron of claim 8, wherein the detector structure means is a silicon Impurity Band Conduction detector.

17. The device for absorbing a photon of light and emitting an electron of claim 8, wherein the detector structure means is coupled to the emitter structure means by a grid electrode.

18. The device for absorbing a photon of light and emitting an electron of claim 8, wherein the detector structure means is efficiently coupled to the emitter structure means through a low resistivity of the detector material.

19. A photocathode device for absorbing a photon of light and emitting an electron, comprising
detector structure means for absorbing the light and creating an electron-hole pair,
voltage means for creating electric fields within and outside the device to separate the electron from the hole and aid in electron emission,
electrical contacts and shields to create and shape the electric fields from the voltage means,
emitter structure means to transfer the electron from the inside of the device to the outside of the device,
wherein the detector structure means is separated from the emitter structure means by an ion-implanted grid electrode.

20. A photocathode device for absorbing a photon of light and emitting an electron, comprising
detector structure means for absorbing the light and creating an electron-hole pair,
voltage means for creating electric fields within and outside the device to separate the electron from the hole and aid in electron emission,
electrical contacts and shields to create and shape the electric fields from the voltage means,
emitter structure means to transfer the electron from the inside of the device to the outside of the device,
wherein the detector structure means is separated from the emitter structure means by an epitaxially-grown grid electrode.

21. The device for absorbing a photon of light and emitting an electron of claim 7, wherein the detector structure means and the emitter structure means are not separated and are made of the same material.

22. The device for absorbing a photon of light and emitting an electron of claim 8, wherein the material of the emitter structure means is epitaxially grown on the material of the detector structure means.

23. A photocathode device for absorbing a photon of light and emitting an electron, comprising
detector structure means for absorbing the light and creating an electron-hole pair,
voltage means for creating electric fields within and outside the device to separate the electron from the hole and aid in electron emission,
electrical contacts and shields to create and shape the electric fields from the voltage means,
emitter structure means to transfer the electron from the inside of the device to the outside of the device,
wherein the emitter structure comprises cone-shaped emitters etched into the detector substrate.

24. The device for absorbing a photon of light and emitting an electron of claim 23, wherein the detector substrate is an epitaxially grown layer.

25. A photocathode device for absorbing a photon of light and emitting an electron, comprising
detector structure means for absorbing the light and creating an electron-hole pair,
voltage means for creating electric fields within and outside the device to separate the electron from the hole and aid in electron emission,
electrical contacts and shields to create and shape the electric fields from the voltage means,
emitter structure means to transfer the electron from the inside of the device to the outside of the device,
wherein the emitter structure means comprises cone-shaped emitters which are greater than 3 μm and less than 20 μm tall.

26. A photocathode device for absorbing a photon of light and emitting an electron, comprising
detector structure means for absorbing the light and creating an electron-hole pair,
voltage means for creating electric fields within and outside the device to separate the electron from the hole and aid in electron emission,
electrical contacts and shields to create and shape the electric fields from the voltage means,
emitter structure means to transfer the electron from the inside of the device to the outside of the device,
wherein the emitter structure means comprises cone-like emitters which are greater than 3 μm and less than 20 μm in diameter.

27. The device for absorbing a photon of light and emitting an electron of claim 8, wherein the device is made from a single solid-state wafer.

28. The device for absorbing a photon of light and emitting an electron of claim 8, wherein the device is made from a single silicon wafer.

29. The device for absorbing a photon of light and emitting an electron of claim 8, wherein the detector structure means and the emitter structure means are epitaxially grown on a single solid-state wafer.

30. The device for absorbing a photon of light and emitting an electron of claim 8, wherein the detector structure means and the emitter structure means are epitaxially grown on a single silicon wafer.

31. The device for absorbing a photon of light and emitting an electron of claim 8, wherein the detector structure means comprises an electrical contact implanted in the solid state wafer.

32. The device for absorbing a photon of light and emitting an electron of claim 8, wherein the detector structure means electrical contact is epitaxially grown on the solid state wafer.

33. The device for absorbing a photon of light and emitting an electron of claim 1, wherein an electric field shield contact means is fabricated on part of the emitter structure outside surface to reduce the internal field between the grid electrode and the emitter surface.

* * * * *